(No Model.)

A. J. LUSTIG.
PROCESS OF SOLDERING TUBES OF PLATED METAL.

No. 352,477. Patented Nov. 9, 1886.

WITNESSES
W. A. Lowe
T. Turner

INVENTOR
Ad. J. Lustig
per Roeder & Briesen
Attorneys

UNITED STATES PATENT OFFICE.

ADOLPHUS JOHN LUSTIG, OF NEW YORK, N. Y., ASSIGNOR OF ONE-FIFTH TO LOUIS KAHN, OF SAME PLACE.

PROCESS OF SOLDERING TUBES OF PLATED METAL.

SPECIFICATION forming part of Letters Patent No. 352,477, dated November 9, 1886.

Application filed March 23, 1886. Serial No. 196,214. (No model.)

*To all whom it may concern:*

Be it known that I, ADOLPHUS JOHN LUSTIG, of the city of New York, county and State of New York, have invented a new and Improved Process of Soldering Tubes of Plated Metal, of which the following specification is a full, clear, and exact description.

This invention relates to soldering tubes of plates compounded of gold and baser metal, to be afterward drawn into wire in the usual manner; and it consists of the process hereinafter described.

In the accompanying drawings the different figures represent the tube in the several stages of the process, more fully referred to in the following specification.

Figure 1:
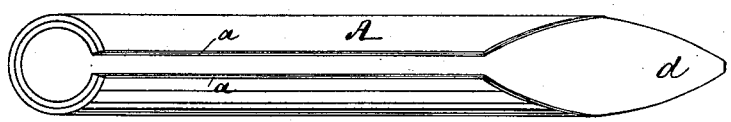

The plate, rolled out of a compound ingot, consisting partly of gold and partly of ungraded metal, of the required thickness, is cut into strips of a width necessary to form a tube of the required size, and is then, with the side consisting of gold outward, bent or rolled together, so that the two edges will meet very nearly, as shown in Figure 1, in the usual manner, as at present practiced.

The process of soldering the two edges together to form a tube, as at present performed, consists in cleaning the edges or lips of the plate and then putting a narrow strip of solder between the same after the plate is rolled into the shape of a tube. Then the borax is applied to both sides and the top of the solder, and then by the application of heat the solder is melted and the edges are soldered. By this process the borax or the solder and borax very often fall into the hollow central part of the tube, whereby the soldering process will not be perfectly performed, and at the same time the distance between the edges or lips has to be considerable to allow the introduction of the strip of solder. This width between the edges required by this process will show more or less after the same has been drawn out into wire.

Figure 2:
Figure 3:
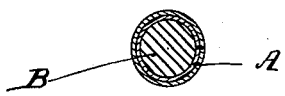

My improvement consists in rolling out the solder similar to a wire, B, Fig. 2, to fit nearly the inside of the tube formed by the plate A when bent together. This wire-solder is then perfectly cleaned, and after borax has been applied to the inside of the tube the wire-solder is inserted into the tube. The thus combined tube and solder is then passed through a drawing-machine to force the lips *a* together. Then the same is placed into a suitable furnace, where the borax and solder are melted and the lips automatically cleaned by this rising borax, and will be soldered together by the upward-forced solder, resulting from the expansion of the solder when the same is melted. At the same time the distance between these edges may be the minimum necessary to allow the required amount of solder while expanding to be pressed between them. The tube is then cleaned in the usual manner by diluted sulphuric acid, when the drawing out of the tube, together with the solder wire remaining in its central part, can be continued until the necessary thickness of wire is obtained. By the continued reduction of the wire the appearance of the solder joint will nearly disappear.

Figure 4:
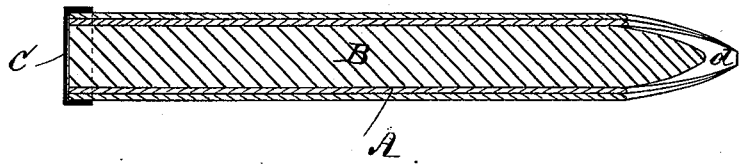

To prevent the melted solder wire flowing or being pressed out at the end of the tube while the same is subjected to the action of heat, I close the end of the tube by a cap, C. (See Fig. 4.) The forward end of the tube is bent over the solder wire for the purpose of allowing a tool to take hold of the same to draw the same through the drawing-plate, and as this forward part of the tube will hardly receive the necessary heat to melt the solder, no further provision is at this end required to hold the solder in the tube. The projection *d*, left at the forward end of the tube, is for the purpose of taking hold of the same while the tube is passed through the wire-drawing machine or plate.

What I claim as my invention is—

1. The herein-described process of soldering compound plated metal plates by inserting the solder, drawn in the shape of wire, together with borax, into the tube formed of the metal plate and then applying heat to the same, as and for the purpose specified.

2. The herein-described process of soldering compound plated metal plates by inserting the solder, drawn in the shape of wire, together with borax, into the tube formed of the metal plate, and covering the end of the tube by a cap, C', and then applying heat, as and for the purpose described.

ADOLPHUS JOHN LUSTIG.

Witnesses:
ROBT. H. ROY,
LOUIS KAHN.